(12) United States Patent
Heim

(10) Patent No.: US 8,022,584 B2
(45) Date of Patent: Sep. 20, 2011

(54) STATOR OF A DYNAMOELECTRIC MACHINE EQUIPPED WITH TEMPERATURE DETECTION

(75) Inventor: Bruno Heim, Grosseibstadt (DE)

(73) Assignee: Siemens Aktiengesellschaft, München (DE)

( * ) Notice: Subject to any disclaimer, the term of this patent is extended or adjusted under 35 U.S.C. 154(b) by 259 days.

(21) Appl. No.: 12/324,148

(22) Filed: Nov. 26, 2008

(65) Prior Publication Data

US 2009/0140614 A1    Jun. 4, 2009

(30) Foreign Application Priority Data

Nov. 29, 2007   (EP) ..................................... 07023180

(51) Int. Cl.
*H02K 11/00*    (2006.01)

(52) U.S. Cl. ................................... 310/68 C

(58) Field of Classification Search ................ 310/68 C
See application file for complete search history.

(56) References Cited

U.S. PATENT DOCUMENTS

| 2,717,945 | A | | 9/1955 | Briggs | |
|---|---|---|---|---|---|
| 3,130,479 | A | * | 4/1964 | Pleiss, Jr. | 29/825 |
| 3,686,523 | A | * | 8/1972 | Gorden et al. | 310/72 |
| 3,842,297 | A | * | 10/1974 | Pleiss et al. | 310/68 C |
| 4,250,419 | A | * | 2/1981 | Zolman | 310/68 C |
| 5,032,749 | A | * | 7/1991 | Stone | 310/68 C |
| 5,831,511 | A | | 11/1998 | Dieterich et al. | |
| 6,028,382 | A | * | 2/2000 | Blalock et al. | 310/68 C |
| 6,153,954 | A | * | 11/2000 | Uchida et al. | 310/68 C |

FOREIGN PATENT DOCUMENTS

DE    201 07 523 U1    7/2001
GB    737 805 A    10/1955

* cited by examiner

*Primary Examiner* — Quyen Leung
*Assistant Examiner* — Naishadh N Desai
(74) *Attorney, Agent, or Firm* — Henry M. Feiereisen; Ursula B. Day

(57) ABSTRACT

A stator for a dynamoelectric machine includes a stator body having slots and a winding system positioned in the slots of the stator body and having coils terminating in winding heads on end faces of the stator body, wherein each slot receives different coil sides of neighboring coils. Arranged between the coil sides in at least one of the slots is a temperature sensor to ascertain a temperature in the stator, in particular between the coil sides of the winding system in the slots of the stator.

13 Claims, 1 Drawing Sheet

STATOR OF A DYNAMOELECTRIC MACHINE EQUIPPED WITH TEMPERATURE DETECTION

CROSS-REFERENCES TO RELATED APPLICATIONS

This application claims the priority of European Patent Application, Serial No. 07023180, filed Nov. 29, 2007, pursuant to 35 U.S.C. 119(a)-(d), the content of which is incorporated herein by reference in its entirety as if fully set forth herein.

BACKGROUND OF THE INVENTION

The present invention relates, in general, to a stator, and more particularly to a stator of a dynamoelectric machine.

Nothing in the following discussion of the state of the art is to be construed as an admission of prior art.

Stators of dynamoelectric machines have a winding system in order to produce a magnetic field. This winding system is positioned in slots in the stator. Current flows through the windings of the winding system, and the losses in the turns of the winding system result, in the slots and thus in the end in the laminated core of the stator as well, in an increased temperature in the stator and in adjacent further equipment. The lost heat is transported away by cooling methods, such as air cooling or liquid cooling.

If cooling is insufficient, the operating behavior of the dynamoelectric machine deteriorates, and may lead to operational failure. Therefore, the temperature of dynamoelectric machines is monitored, using temperature sensors which are attached to the laminated core of the stator or to the end windings of the winding arranged in the slots of the stator of the dynamoelectric machine. This approach is inadequate as it fails to ascertain the temperature in the stator, in particular between the coil sides of the winding systems in the slots of the stator, which experience widely differing voltage potentials on the windings.

It would therefore be desirable and advantageous to address this problem and to obviate other prior art shortcomings.

SUMMARY OF THE INVENTION

According to one aspect of the present invention, a stator includes a stator body having slots, a winding system positioned in the slots of the stator body and having coils terminating in winding heads on end faces of the stator body, wherein each slot receives different coil sides of neighboring coils, and a temperature sensor arranged between the coil sides in at least one of the slots.

The present invention resolves prior art problems by arranging a temperature sensor between the coil sides of different coils in at least one slot of the stator, in particular when coil sides of tooth-wound coils in a slot are involved, so that the actual temperature profile can now be ascertained within the slot in the winding system, without the need for computation models to determine the actual temperature on the basis of an end-winding temperature or a laminated-core temperature of the stator.

Common to all motor types is the placement of the temperature sensor at the same point in the slot so that the comparable temperature can be detected at the comparable measurement point, and thus a comparable temperature behavior of the dynamoelectric machine can be recorded directly. Unwanted scatters in the response behavior of the temperature sensor caused by different measurement points and/or temperature couplings can thus be minimized.

According to another advantageous feature of the present invention, the temperature sensor can be located on a mounting strip which in turn is in particular in the form of a phase separator. In other words, when a phase separator is installed in a slot, not only the phase separator itself but also the temperature sensor is inserted into the slot.

As the installation area in a slot is tight, the temperature sensor may be located in a stamped-out area of the mounting strip, with the contour of the stamped-out area complementing the contour of the temperature sensor. Suitably, the temperature sensor may be fixed in place by at least one layer of an electrical insulating tape, such as a Kapton tape. The presence of the electrical insulating tape ensures or at least enhances the maintenance of the required dielectric strength between the two coil sides in the slot.

According to another aspect of the present invention, a method includes the steps of interlocking a laminated core by stamping and stacking, inserting coils of a winding in slots of the laminated core, separating phases between different coil sides in each of the slots of the laminated core, and impregnating the laminated core to make a stator.

According to another advantageous feature of the present invention, the separating step may include the step of inserting a phase separator between the different coil sides in each of the slots of the laminated core, wherein a temperature sensor is inserted on at least one of the phase separators.

According to another advantageous feature of the present invention, the separating step may include the step of inserting in at least one of the slots of the laminated core a mounting strip which is placed between the different coil sides, wherein a temperature sensor is inserted on the mounting strips.

After impregnation of the stator of the dynamoelectric machine, the temperature sensor is thus anchored and fixed in a vibration-resistant manner by the coupled securement and the adhesive bonding through impregnation.

According to another advantageous feature of the present invention, the temperature sensor may be a KTY84 temperature sensor.

According to another advantageous feature of the present invention, the mounting strip may be made of rigid material and allows simple plug assembly of the temperature sensor between the phase intermediate layers, i.e., for example, a two-layer phase separator, particularly in the case of tooth-wound coils. An insertion depth is limited by the temperature sensor, which projects on both sides from the mounting strip, such that the temperature sensor is mounted in a simple manner in a same position both radially and axially between the two coil sides in a slot.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
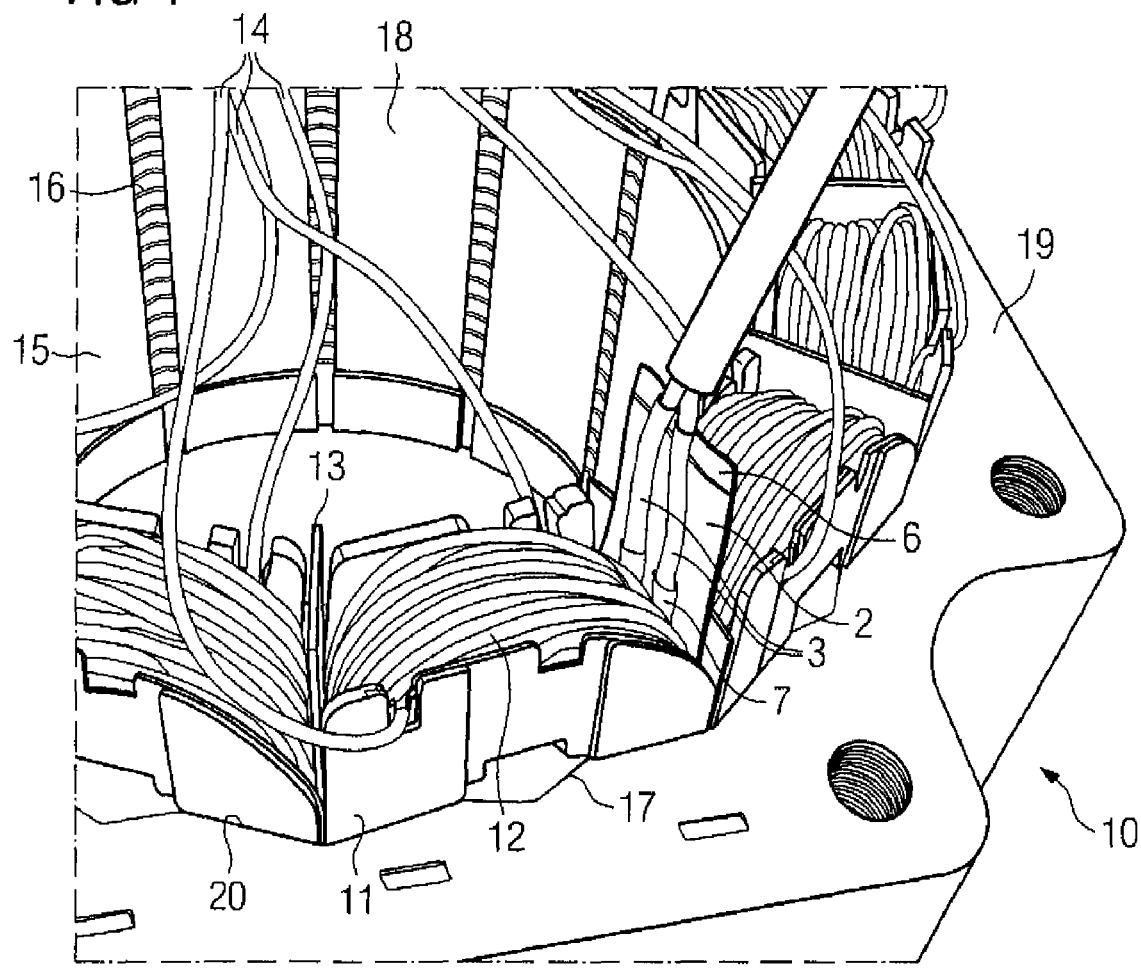
FIG. 1 is a perspective view of part of a stator according to the present invention, depicting a principal illustration of a winding system.
Figure 2:
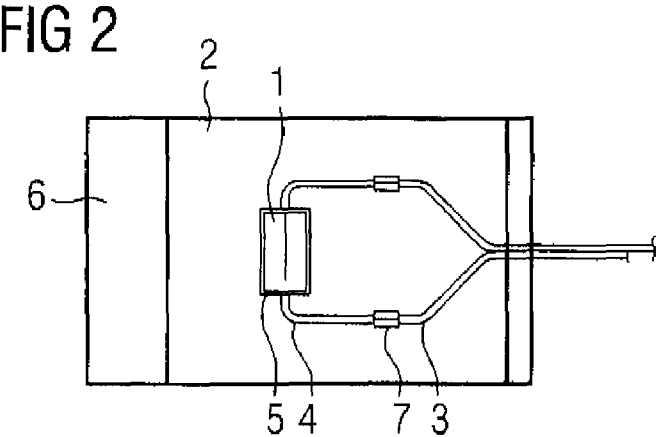
FIG. 2 is a principal configuration of a temperature sensor secured onto a mounting strip.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of part of a stator according to the present invention, generally designated by reference numeral 10. The stator 10 has a stator body and a winding system which is attached to the stator body and is formed by tooth-wound coils 12. It is to be understood that the principles described in the following description with respect to illustrated winding system 12 is equally applicable to other winding systems, such as distributed winding systems or fractional-pitch winding systems.

The stator 10 is formed in two parts, i.e. the stator 10 has a yoke rear 19 and a laminated star which is inserted into the yoke rear 19 and includes teeth comprised of tooth shanks 17 and tooth heads 18. Each tooth is formed from individual laminates 15, with every x-th laminate, in particular every 5th laminate, having a continuous web to form, when viewed in the circumferential direction, a cohesive laminate 16 in the area of the tooth heads 18. As a result, the star is robust during further processing, and slot scatter is sufficiently reduced compared to completely closed slots.

When the star-shaped configuration is viewed axially, a predefined sequence of individual laminates and laminates which are closed via the slots 20 is established.

The tooth-wound coils 12 are advantageously arranged on coil bobbins 11 and plugged radially onto the star from the outside. The star can then be inserted axially into its yoke rear 19, and can be encapsulated. The winding systems of the tooth-wound coil 12 form hereby end windings 14 on the end faces of the stator 10. Each slot 20 of the stator 10 receives two coil sides of different tooth-wound coils 12, whereby a voltage potential exists between these coil sides in a slot 20 so that the presence of a phase separator 13 is required between coil sides. Of course, the winding wires of the respective tooth-wound coils 12 may also be constructed with thicker insulation to eliminate the need for phase separators; However, this reduces the copper filling factor of the slot and enlarges the end winding 14.

Inserted between the phase separators 13 in one slot 20 or directly into the space between the coil sides of the coils, in particular the tooth-wound coils 12, in at least one slot 20, is a mounting strip 6 which has attached thereon a temperature sensor 1, e.g. a KTY84 temperature sensor. Of course, a phase separator 13 may also be constructed to have a temperature sensor 1 attached thereto, in which case the phase separator 13 constitutes itself the mounting strip 6. The temperature sensor 1 may additionally be covered by electrical insulating tapes 2 to protect against the voltage potentials. The temperature sensor 1 is connected to the outside via a connecting wire 4 and via connecting braids 3 for transmission of temperature information.

The temperature sensor 1 can likewise also be positioned between two mounting strips 6, in particular in the region of a stamped-out area 5 to further optimize the installation space. The temperature sensor 1 is hereby provided in the stamped-out area 5 in the mounting strip 6. The stamped-out area 5 ensures that the temperature sensor 1 is seated in an initially fixed manner at the same point on the mounting strip 6. The temperature sensor 1 is insulated and at the same time fixed by one or more layers of a temperature-resistant electrical insulating tape 2. The mounting strip 6 which in particular is made of rigid material, thus allows a simple plug assembly of the temperature sensor 1 between the coil sides of a slot 20 and/or between phase separators 13 of the adjacent coil sides of the tooth-wound coils 12 in a slot 20.

The insertion depth is limited by the body, in particular glass body, of a projecting temperature sensor 1 which projects on both sides out of the mounting strip 6 or mounting plate. Particularly in the case of tooth-wound coils 12 which are adjacent in a slot 20, a gap is formed on the end face of the stator 10, i.e. at the junction of the round end face of the end windings of the tooth-wound coils 12 into the straight coil side which is located in the slot. The gap tapers on the straight coil sides sufficient to clamp the body of the temperature sensor 1 at the same point. The body of the temperature sensor 1 may have a thickness of about 1.4 mm. The mounting strip 6 is clamped between the longitudinal coil sides in such a way that the bilaterally projecting body of the temperature sensor 1 is supported on the two tooth-wound coils which are located in a slot 20.

The temperature sensor 1 can therefore constantly be attached at the intended point between the two coil sides. The attachment of the temperature sensor 1 is used in particular for the pre-assembly and is further secured and positioned through impregnation of the stator 10. The temperature sensor 1 is therefore positioned in a vibration-resistant manner in close proximity to the critical heat source. As a result, there is no need to deduce the actually relevant temperature within the winding in the slot 20 by means of complex conversion methods.

When the mounting strip 6 is positioned between phase separators 13, it is sufficient for the length of the mounting strip 6 to occupy part of the axial length of the stator 10. However, when the temperature sensor 1 is arranged in a phase separator 13 and, optionally, covered by electrical insulating tape 2, the phase separator 13 has a length which is at least the axial length of the stator 10 in order to have the necessary dielectric strength between the coil sides in a slot 20.

The temperature sensor 1 detects the temperature of two coils in one slot 20. Particularly if the dynamoelectric machine is subjected to an unbalanced load, adequate temperature monitoring is ensured when coil sides of the different phase are arranged in one slot 20.

The temperature sensor 1 is connected by its connecting wires 4 via a contact 7 to the connecting braids 3. These connecting braids 3 lead, for example, to other temperature sensors in the dynamoelectric machine or to monitoring sensors for oscillations, etc. via a multiplexer to a display or monitoring unit, which can also initiate disconnection of the dynamoelectric machine, depending on the transmitted information.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A stator, comprising:
   a stator body having slots;
   a winding system positioned in the slots of the stator body and having coils terminating in winding heads on end faces of the stator body, wherein each slot receives different coil sides of neighboring coils;
   a temperature sensor attached to the mounting strip; and
   a mounting strip having attached thereon the temperature sensor and inserted in a space between the coil sides in at least one of the slots at an insertion depth which is limited by a projection of the temperature sensor on both sides of the mounting strip to thereby clamp the temperature sensor between the coil sides.

2. The stator of claim 1, wherein the temperature sensor is positioned in a predeterminable manner between the coil sides.

3. The stator of claim 1, wherein the mounting strip forms a phase separator between the coil sides.

4. The stator of claim 1, wherein the mounting strip has a stamped-out area which has a contour complementing the temperature sensor for placement of the temperature sensor.

5. The stator of claim 1, wherein the mounting strip is made of rigid material.

6. The stator of claim 1, wherein the temperature sensor is fixed in place by at least one layer of an electrical insulating tape.

7. The stator of claim 6, wherein the electrical insulating tape is a Kapton tape.

8. The stator of claim 1, for use in a dynamoelectric machine.

9. A method, comprising the steps of:
   interlocking a laminated core by stamping and stacking;
   inserting coils of a winding in slots of the laminated core;
   securing a temperature sensor on a mounting strip;
   placing the mounting strip with the temperature sensor between different coil sides in each of the slots of the laminated core at an insertion depth which is limited by a projection of the temperature sensor on both sides of the mounting strip to thereby clamp the temperature sensor between the coil sides; and
   impregnating the laminated core to make a stator.

10. The method of claim 9, wherein the winding includes tooth-wound coils.

11. The method of claim 9, wherein the winding is a classical winding.

12. The method of claim 9 for making a stator for a dynamoelectric machine.

13. The method of claim 9, wherein the temperature sensor is a KTY84 temperature sensor.

* * * * *